United States Patent
Stenkvist

[11] 4,228,314
[45] Oct. 14, 1980

[54] DC ARC FURNACE HEARTH

[75] Inventor: Sven-Einar Stenkvist, Vesteras, Sweden

[73] Assignee: ASEA Aktiebolag, Vesteras, Sweden

[21] Appl. No.: 15,587

[22] Filed: Feb. 27, 1979

[30] Foreign Application Priority Data

Feb. 28, 1978 [SE] Sweden .............................. 7802240

[51] Int. Cl.$^2$ ............................................ H05B 7/00
[52] U.S. Cl. ........................................ 13/9 R; 13/35
[58] Field of Search ................ 13/9, 11, 12, 18 R, 13/35

[56] References Cited
U.S. PATENT DOCUMENTS 941,419  11/1909  Keller ................................. 13/18 R
3,835,230  9/1974  Valchev et al. .......................... 13/9

Primary Examiner—Roy N. Envall, Jr.
Attorney, Agent, or Firm—Kenyon & Kenyon

[57] ABSTRACT

A DC arc furnace hearth is formed by a layer of carbon bricks above which an electrically relatively non-conductive refractory compound is rammed to contain a melt, and metal bars or rods inserted through the compound so that their upper ends are exposed to the melt and their bottom ends are in electrical connection with the bricks, forming an electrically conductive hearth. An arcing electrode above the melt can be connected to one pole of DC power and the hearth connected to the other so that an arc is formed between the electrode and melt.

6 Claims, 1 Drawing Figure

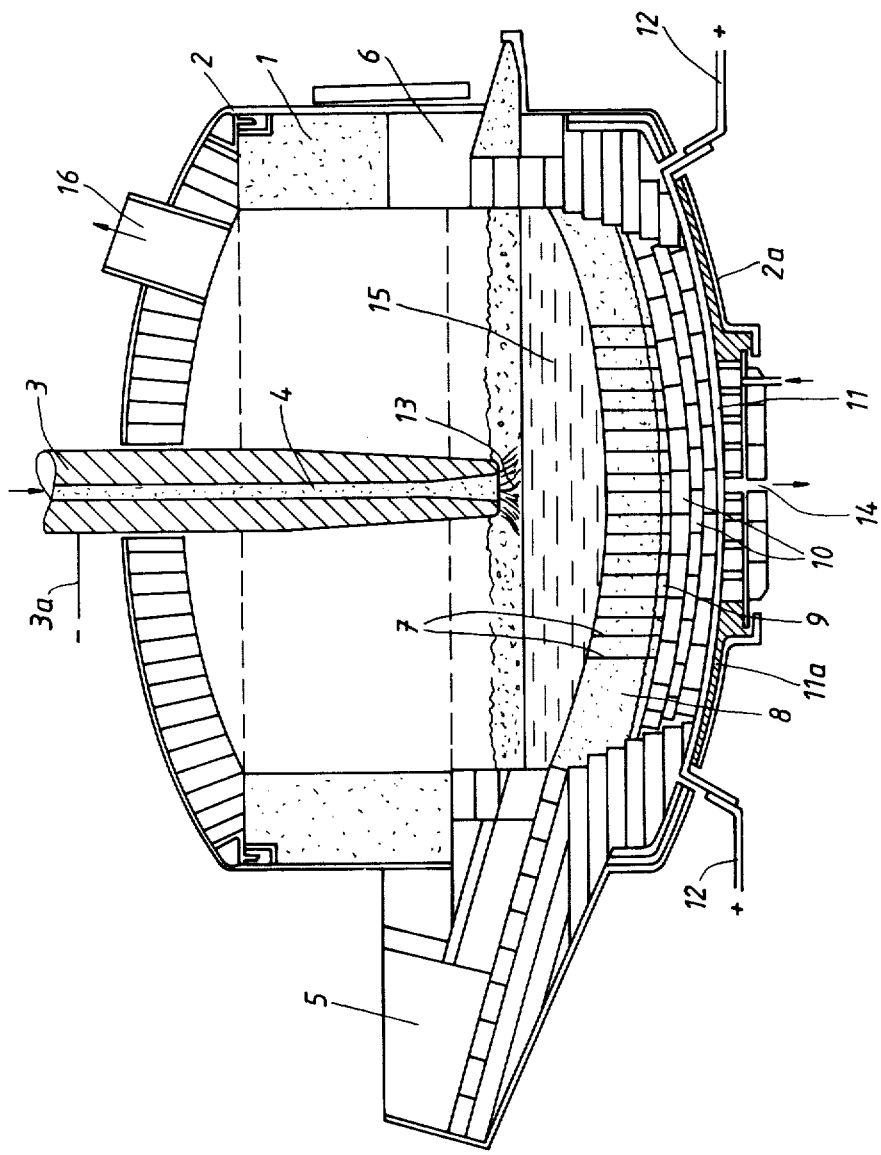

DC ARC FURNACE HEARTH

BACKGROUND OF THE INVENTION

One conventional form of a DC arc furnace has at least one arcing electrode and beneath it a hearth for containing a melt. DC power applied with one pole connected to the melt and the other to the electrode forms an arc putting heat into the melt. When the electrode is of the consumable type, smoother arc operation and less electrode wear is obtained when the connections make the melt anodic and the electrode cathodic.

For the electrical connection with the melt, it has been considered safer to provide a melt connection horizontally offset from beneath the arc, an arrangement reducing the risk of a melt breakout. This has the disadvantage that the arc is deflected either towards or away from the melt electrode, in either case resulting in an arc flare that is directed steadily against a localized portion of the furnace side wall lining with consequent rapid erosion of the lining at that portion.

A hearth made of carbon bricks or blocks can contain the melt and form an electrical connection distributing the electromotive forces symmetrically around the electrode so that the arc is vertical with its arc flare distributed uniformly around the furnace side wall lining, avoiding the concentrated erosion effect. However, such an electrically conductive hearth is not only expensive to build, but it also is expensive to maintain in serviceable condition as contrasted to what is involved by a conventional hearth with which a side melt contact can be associated.

A conventional electric arc furnace hearth has a steel shell extending under the furnace bottom and supporting a layer of refractory bricks, such as silica or magnesite bricks, and above which a layer of quartzite, dolomite, or aluminum or magnesium oxide particles forming a refractory compound is rammed. This rammed compound is initially moist and plastic and is hardened by heating prior to the hearth receiving a melt. This is a well-known hearth construction and has a reputation for safety and relatively low cost maintenance. The rammed refractory is relatively non-conductive in the sense that although when dried and contacted by the melt its conductivity may increase somewhat, the conductivity is not nearly adequate to permit the hearth to be used as a melt connection.

Some refractories capable of containing the melt do become conductive at the temperature of the melt, but suffer the disadvantage that they must be brought to that temperature before an arc furnace can be put into operation with the hearth forming a melt connection, and this is an operational disadvantage. To provide a melt connection permitting the maintenance of a vertical arc, suggestions have been made to use vertical plate electrodes positioned centrally in the furnace bottom with the relatively non-conductive refractory compound between the plates. With the plates directly below the arc, such suggestions have been considered as involving too great a risk of melt breakout through the hearth.

DESCRIPTION OF THE INVENTION

According to the present invention, the usual non-conductive bricks supporting the rammed compound are replaced by carbon bricks and the usual relatively non-conductive compound is then rammed into place on the bricks. To provide the electrical conductivity, a cluster of vertical metal bars or rods are inserted through the compound so that their bottom ends are in electrical connection with the carbon bricks, which are electrically conductive, and their top ends are exposed to the melt ultimately contained by the rammed compound surface of the hearth. The top of the rods may be substantially flushed with the rammed compound and it is possible to install the rods while the compound is still moist so that the rods can be driven down through the compound and into position. It might also be possible to drive the rods through the compound after it has been hardened.

The cluster of rods are symmetrically arranged with uniform interspacing at least around the area below the arcing electrode and preferably so as to extend as a circular or annular cluster almost adjacent to the hearth periphery. The number and interspacing of the bars or rods depends on the diameter of the bars or rods used (preferably they are of the same diameter), and these factors are selected so that the cluster as such can carry the necessary arcing electric power from the carbon bricks to the melt when it is contained by the hardened, electrically relatively non-conductive conventional furnace compound.

When the hearth is dried and in service, electrical connections with the carbon bricks and the arcing electrode can power the arc, assuming a suitable source of DC power. Normally the connections would be such that the melt is anodic and the electrode is cathodic as previously suggested.

It can be seen that with this construction the hearth can be expected to have a service life and ease of maintenance comparable or equal to the conventional furnace hearth. The carbon bricks are protected against erosion so that their service life is unlimited in the practical sense, hearth servicing requiring only repair of the conventional rammed hearth compound as is usual.

When the hearth is in use, the metal bars, normally iron or steel when the melt is iron or steel, are melted from their tops downwardly, but they remain effective. Observation of the visible evidence of such melting obtainable when the hearth is being repaired so as to possibly expose these metal elements, may provide an indication of the depth of heat penetration into the rammed compound suggesting that at other points the melt may have also penetrated the rammed compound so as to have altered its refractory characteristics.

Preferably a layer of graphite is laid on the carbon bricks and the non-conductive refractory composition, the usual composition for example, is rammed into position, the bottoms of the rods when they are installed then penetrating this layer of graphite which is in firm connection with the carbon bricks. Completion of the electric circuit is effected by installing a metal plate, steel plate, for example, below and in direct contact with the carbon bricks. This plate should be of very substantial area to carry the current throughout a large area of the bricks and thence via the graphite layer to the bottoms of the bars or rods. With the furnace having the usual steel shell which extends under its bottom to support the hearth, a suitable refractory electrical insulation should be interposed between this steel shell and the connection plate in contact with the carbon bricks. In other words, the usual shell can provide its normal supporting function which via refractory insulation provides support for the metal contact or plate which, in turn, supports the carbon bricks and graphite layer and, therefore, the rammed refractory which ultimately contains the melt. The entire construction can be as secure, safe and easy to maintain as is the conventional furnace and hearth construction. Preferably the contact plate should extend throughout the major amount and possibly the entire extent of the hearth bottom so that it can be made of steel while providing adequate electrical current carrying ability. A copper plate could be used instead. Correspondingly, the carbon brick layer should also be coextensive or substantially coextensive with the hearth area. If other bricks of adequate electrical conductivity and refractory characteristics are available, they could be used instead. Preferably the graphite layer should also be coextensive or almost so with the hearth area and, finally, the cluster of bars or rods should likewise be almost coextensive with the hearth area.

In any event, the cluster of bars or rods, and, therefore of the conductive element connecting with them, should at least be extensive enough so that with the bars or rods symmetrically arranged around the axis of the electrode and furnace, or around the axis of a group of arcing electrodes if more than one is used, there is an assurance that the electromotive forces involved distribute uniformly and equally around the arc or axis formed by the electrode or electrodes. In this way a vertical arc or axis is assured. The electrical field is widely and uniformly distributed around the arc or arcs.

In the interest of maximum possible safety life, at least the central portion of the contact or plate beneath the carbon bricks is forcibly cooled as by means of a water-cooling assembly operatively associated with the central portion of the contact or plate. It is considered desirable to have such a cooling area also relatively extensive as compared to the overall extent of the hearth above it.

Instead of carbon bricks there may be used electrically conducting bricks, comprising a considerable amount of graphite, for example magnesite-graphite bricks containing about 20% graphite.

BRIEF DESCRIPTION OF THE DRAWING

The accompanying drawing in vertical elevation and to some extent schematically, illustrates a DC electric arc furnace having a hearth exemplifying the principles of the present invention.

DETAILED DESCRIPTION OF THE DRAWING

The illustrated furnace is of the type used for the melt reduction of iron oxides, usually in the form of powdered iron ore, possibly prereduced to some extent, and which is fed through a tubular arcing electrode into a carbonaceous iron melt so that a reaction occurs between the oxides and the carbon reducing the oxides to molten iron. The melt continuously increases in volume and is from time to time tapped as required. The furnace can operate continuously until it must be shut down for repairs to either the lining or the hearth. The electrode used is consumable, such as by being either carbon, graphite or of the Soderberg type, and is tubular in the sense that it has an axially extending feeding passage for the powdered material, and is preferably operated so that the melt is anodic and the electrode is cathodic.

With the above introduction, the furnace may have the usual side wall lining 1 and is enclosed by the customary steel shell 2 with the tubular electrode 3 depending through an opening in the furnace roof, the feeding passage being shown at 4 extending axially through the electrode. Although the details are not shown, it is assumed to be of the usual rocking type, the melt pouring spout being indicated at 5 and the deslagging port at 6.

The cluster of steel bars 7 extending through the rammed compound 8 are shown as extending throughout an area almost as large as the interior of the furnace. Although no plan view is shown, it is to be understood that the cluster of bars 7 is circular in contour and, as is indicated by the drawing, are symmetrically arranged around the axis of the electrode 3. The layer of graphite is shown at 9 above the carbon bricks 10 which are, in turn, supported by the steel contactor plate 11 extending for the entire extent of the furnace bottom, this plate, in turn, being supported by the bottom 2a of the shell 2 via appropriate insulation indicated at 11a. The shell bottom 2a can be made centrally opened to provide clearance for a water-cooling assembly 14 fixed to the central portion of the bottom of the plate 11, and with other openings through which downwardly bent ends of the plate 11 extend to form connectors with the external power source, as indicated at 12. These would be positive connections, the negative connection of the electrode 3 being schematically indicated at 3a.

In the drawing the vertically directed arc 13 is indicated as being formed between the tip of the electrode 3 and the melt 15 in the hearth. The reaction between the oxides and carbon produces gas which can be withdrawn via the outlet 16 in the furnace roof.

The overall operation of the illustrated furnace has already been adequately indicated and is generally understandable to persons of skill.

The bars 7 would in this instance be made of iron or steel or, in other words, compatible with the carbonaceous iron melt 15. The rammed material 8 through which the rods 7 are driven, preferably while the material 8 is still plastic and before its hardening, may be any of the well-known hearth compounds rammed to form a hearth bottom. The rammed compound may, as previously indicated, be any of the usual ground quartzite, dolomite or aluminum or magnesium oxide. The bricks 10 must be electrically conductive in the sense that they have adequate conductivity and refractory characteristics to permit their use as a large conductive bed protected against the melt 15 by the layer of rammed compound 8. The graphite layer 9 might be substituted by any other refractory material that is adequately conductive, but at the present state of the art graphite is indicated. The steel or copper plate 11 also should be designed to carry the arcing current and preferably it should extend throughout the entire hearth bottom. It is not required to have great structural strength because it is supported via the electrical insulation 11a by the furnace shell bottom 2a. The water cooling assembly 14 may be of any design and may, in some instances, not be necessary, although its use is considered preferable.

It should be understood that the general concept is to permit the use of what is essentially as to its structural and refractory characteristics, the conventional and very reliable hearth construction, but which is, in this instance, electrically conductive throughout a very wide area symmetrically surrounding the electrode 3 and its arc 13. For repairs, only the electrically conductive metal bars or rods 7 and the rammed compound 8 need be considered, the costs involved by the rammed material 8 being only as usual while the bars or rods 7 are inherently inexpensive. Installation of the bars or rods involves only their being driven with a correct cluster formation and location through the usual rammed material.

As previously indicated, the rammed material is considered to be electrically non-conductive in the sense that even when hot it is inherently incapable of conducting the arcing power required by the furnace. The bars or rods, graphite layer, carbon bricks and material conductor plate are all considered to be electrically conductive in the sense that they can, with the bars or rods acting in parallel, carry the electric power required by the arc.

Throughout the foregoing, it is to be understood that as usual the arcing electrode or electrodes are arranged centrally with respect to the furnace and its hearth, and that the furnace and hearth in the conventional manner have a generally circular contour in the horizontal direction. The arcing electrode or electrode's tip or tips are, therefore, positioned substantially centrally above the hearth and are, of course, adapted to form an arc with the melt.

What is claimed is:

1. A DC arc furnace comprising an electrically conductive hearth adapted to contain a melt, at least one arcing electrode having a tip positioned substantially centrally above the hearth and adapted to form an arc with the melt, and means for connecting said electrode and hearth with DC power; wherein the improvement comprises said hearth comprising a substantially electrically non-conductive refractory compound rammed on a layer of electrically conductive bricks, and a cluster of vertically elongated metal elements which each extend through said compound from the top of the compound downwardly to electrical connection with said layer, said cluster extending from below said tip in all radial directions throughout an area large enough to carry DC power to a melt in the hearth and which is adequate to power said arc, and said bricks resting on a metal plate that is at least coextensive with said area and having means for connecting with said power.

2. The furnace of claim 1 in which said area is symmetrical with respect to said tip of the arcing electrode.

3. The furnace of claim 1 in which a layer of electrically conductive material is interposed between said compound and said bricks and said elements are in the form of metal rods driven through said compound and into said material, the material being soft enough to be penetrated by the rods.

4. The furnace of claim 1 in which said bricks contain carbonaceous material.

5. The furnace of claim 1 in which said metal plate has means for cooling at least its central portion.

6. The furnace of claim 1 in which the bricks are magnesite-graphite bricks containing about 20% graphite.

* * * * *